(12) United States Patent
Watanabe et al.

(10) Patent No.: US 10,110,066 B2
(45) Date of Patent: Oct. 23, 2018

(54) WIRELESS POWER TRANSMITTER, CONTROL CIRCUIT THEREOF, CHARGER, AND CALIBRATION METHOD OF FOREIGN OBJECT DETECTION BY POWER LOSS METHOD

(71) Applicant: ROHM CO., LTD., Ukyo-ku, Kyoto (JP)

(72) Inventors: Masatoshi Watanabe, Kyoto (JP); Tomoya Morinaga, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 218 days.

(21) Appl. No.: 15/275,786

(22) Filed: Sep. 26, 2016

(65) Prior Publication Data
US 2017/0093214 A1 Mar. 30, 2017

(30) Foreign Application Priority Data
Sep. 29, 2015 (JP) .................. 2015-192035

(51) Int. Cl.
*H02J 50/10* (2016.01)
*H02J 50/80* (2016.01)
*H02J 50/60* (2016.01)
*H02J 7/02* (2016.01)

(52) U.S. Cl.
CPC ............ *H02J 50/10* (2016.02); *H02J 7/025* (2013.01); *H02J 50/60* (2016.02); *H02J 50/80* (2016.02)

(58) Field of Classification Search
None
See application file for complete search history.

(56) References Cited

U.S. PATENT DOCUMENTS

| | | | | |
|---|---|---|---|---|
| 2017/0149291 A1* | 5/2017 | Iwasaki | .................. | H02J 50/12 |
| 2018/0123395 A1* | 5/2018 | Onishi | .................... | H02J 50/10 |
| 2018/0138749 A1* | 5/2018 | Lee | ......................... | H02J 50/12 |
| 2018/0152041 A1* | 5/2018 | Onishi | ................... | H02J 7/025 |

FOREIGN PATENT DOCUMENTS

| | | |
|---|---|---|
| JP | 2013038854 A | 2/2013 |
| JP | 2014107971 A | 6/2014 |

* cited by examiner

*Primary Examiner* — Daniel Kessie
*Assistant Examiner* — Swarna N Chowdhuri
(74) *Attorney, Agent, or Firm* — Cantor Colburn LLP (57) ABSTRACT

A wireless power transmitter transmitting a power signal to a wireless power receiver, includes: a transmission antenna; an inverter circuit applying an AC driving signal to the transmission antenna; and a control circuit controlling the inverter circuit. The control circuit includes: a demodulator demodulating a control signal received by the transmission antenna from the wireless power receiver; a transmission power measurement part measuring transmission power to generate transmission power data; and a logic circuit that controls the inverter circuit based on power control data included in the control signal to change the transmission power, control the inverter circuit based on the control signal to be transmitted to the wireless power receiver to modulate the power signal, and perform foreign object detection by a power loss method based on transmission power data and reception power data included in the control signal. The logic circuit is configured to perform a calibration sequence.

10 Claims, 9 Drawing Sheets

WIRELESS POWER TRANSMITTER, CONTROL CIRCUIT THEREOF, CHARGER, AND CALIBRATION METHOD OF FOREIGN OBJECT DETECTION BY POWER LOSS METHOD

CROSS-REFERENCE TO RELATED APPLICATION

This application is based upon and claims the benefit of priority from Japanese Patent Application No. 2015-192035, filed on Sep. 29, 2015, the entire contents of which are incorporated herein by reference.

TECHNICAL FIELD

The present disclosure relates to a wireless power supply technique, and more particularly, to the control of transmission power.

BACKGROUND

Recently, in order to supply electric power to an electronic device, wireless power supply has begun to come into commonplace use. In order to promote the compatibility of products of different manufacturers, a wireless power consortium (WPC) has been organized, and a Qi standard, which is an international standard, has been developed by the WPC.

A wireless power supply that conforms to the Qi standard uses electromagnetic induction between a transmission coil and a reception coil. A power supply system includes a power supply device including a transmission coil and a power reception terminal including a reception coil.

Figure 1:
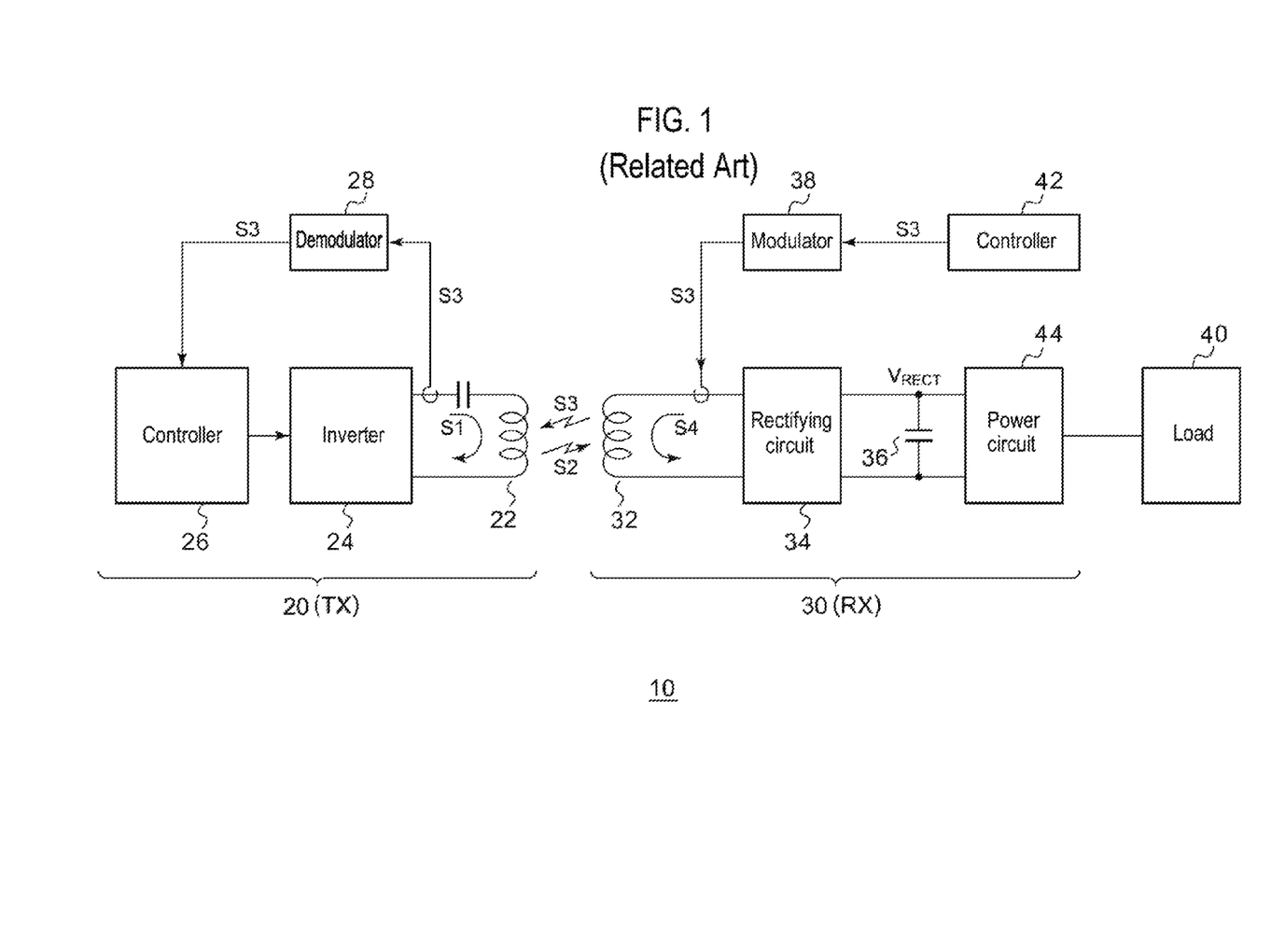
FIG. 1 is a view illustrating a configuration of a wireless power supply system based on the Qi standard.

FIG. 1 is a view illustrating a configuration of a wireless power supply system 10 that conforms to the Qi standard. The power supply system 10 includes a power transmitter (TX) 20 and a power receiver (RX) 30. The power receiver 30 is mounted on an electronic device such as a mobile phone terminal, a smartphone, an audio player, a game machine, or a tablet terminal The power transmitter 20 includes a transmission coil (primary coil) 22, an inverter circuit 24, a controller 26, and a demodulator 28. The inverter circuit 24 includes an H-bridge circuit (full-bridge circuit) or a half-bridge circuit and applies a driving signal S1, specifically, a pulse signal, to the transmission coil 22 such that a driving current flows through the transmission coil 22, thereby allowing the transmission coil 202 to generate an electrical power signal S2 in the form of an electromagnetic field. The controller 26 performs an overall control of the entire power transmitter 20.

In the Qi standard, a communication protocol is defined between the power transmitter 20 and the power receiver 30, which enables information transmission from the power receiver 30 to the power transmitter 20 via a control signal S3. The control signal S3 in the form of an AM (Amplitude Modulation) modulated signal using backscatter modulation is transmitted from the reception coil 32 (a secondary coil) to the transmission coil 22. The control signal S3 includes, for example, electric power control data (also referred to as a packet) for controlling an amount of electric power to be supplied to the power receiver 30, data indicating unique information of the power receiver 30, or the like. The demodulator 28 demodulates the control signal S3 based on a current or a voltage from the transmission coil 22. The controller 26 controls the inverter circuit 24 based on the power control data included in the demodulated control signal S3.

The power receiver 30 includes a reception coil 32, a rectifying circuit 34, a smoothing capacitor 36, a modulator 38, a load 40, a controller 42, and a power circuit 44. The reception coil 32 receives a power signal S2 from the transmission coil 22, and transmits a control signal S3 to the transmission coil 22. The rectifying circuit 34 and the smoothing capacitor 36 rectifies and smoothes a current S4 induced in the reception coil 32 depending on the power signal S2 to convert the same into a DC voltage $V_{RECT}$.

The power circuit 44 charges a secondary battery (not shown) using electric power supplied from the power transmitter 20 or steps up or down the DC voltage $V_{RECT}$ to supply the same to the controller 42 and the load 40.

The controller 42 generates an electric power control data (also referred to as a control error (CE) packet) for controlling a power supply amount from the power transmitter 20 such that the rectified voltage $V_{RECT}$ approaches its target value. The modulator 38 modulates the control signal S3 including the electric power control data and modulates a coil current of the reception coil 32, thereby modulating a coil current and a coil voltage of the transmission coil 22.

The Qi standard was initially developed for a low power of 5 W or lower of mobile phone terminals, smartphones, tablet terminals, or the like (Volume I Low Power, hereinafter referred to as Low Power standard). Thereafter, preparation of developing a middle power up to 15 W (Volume II Middle Power, hereinafter referred to as Middle Power standard) is in progress, and the support for a large power of 120 W in the future is planned.

Since the power transmitter 20 and the power reception terminal (electronic device) are disposed in a relatively free space in the power supply system 10, a conductive foreign object such as a metal piece may be placed between or in the vicinity of the transmission coil 22 and the reception coil 32. When wireless power supply is performed in this state, a current may flow through the foreign object, leading to power loss. In addition, the foreign object may generate heat. Thus, in the Qi standard, foreign object detection (FOD) is defined.

Figure 2:
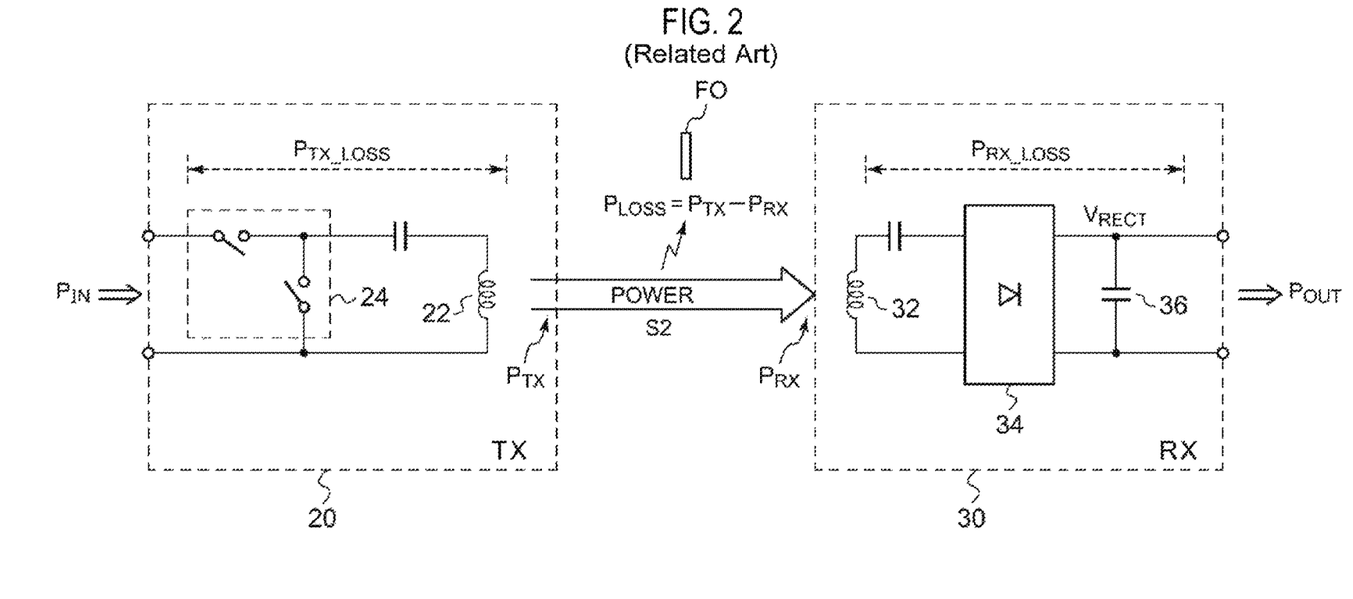
FIG. 2 is a view illustrating a power loss method.

In the FOD, power $P_{TX}$ of the power signal S2 transmitted by the power transmitter 20 and power $P_{RX}$ of the power signal S2 received by the power receiver 30 are compared, and, when an inconsistency (difference) between the power $P_{TX}$ and the power $P_{RX}$ exceeds an allowable value, it is determined that a foreign object is present. This is referred to as a power loss method. FIG. 2 is a view illustrating the power loss method. A difference between the transmission power $R_D$ (and the reception power $P_{RX}$ is a power loss $P_{LOSS}$, and the power loss $P_{LOSS}$ becomes greater when a foreign object FO is present and becomes smaller when the foreign object FO is not present. Thus, in the power loss method, it is determined whether the foreign object FO is present or not, based on the power loss $P_{LOSS}$.

The transmission power $P_{TX}$ and the reception power P are given by the following equations.

$$P_{TX} = P_{IN} - P_{TX\_LOSS}$$

$$P_{Rx} = P_{OUT} + P_{RX\_LOSS}$$

Even though $P_{IN}$ and $P_{OUT}$ may be precisely measured, it is difficult to accurately measure a power loss $P_{TX\_LOSS}$ in the power transmitter 20 and a power loss $P_{RX\_LOSS}$ in the power receiver 30. Thus, the measurement values of the transmission power $P_{TX}$ and the reception power $P_{RX}$ include an error to a degree. When an error between the measurement values of the transmission power $P_{TX}$ and the reception power Pp and their actual values is large, an error of the power loss $P_{LOSS}$ may also be increased, causing a problem that the foreign object FO may be erroneously detected or the foreign object FO may not be detected.

In the middle power standard, since the transmission power can be raised up to 15 W, it is severe for a foreign object and more accuracy is required for foreign object detection, as compared with the low power standard. Thus, in the middle power standard, power calibration was defined in order to increase the precision of the power loss method.

Figure 3:
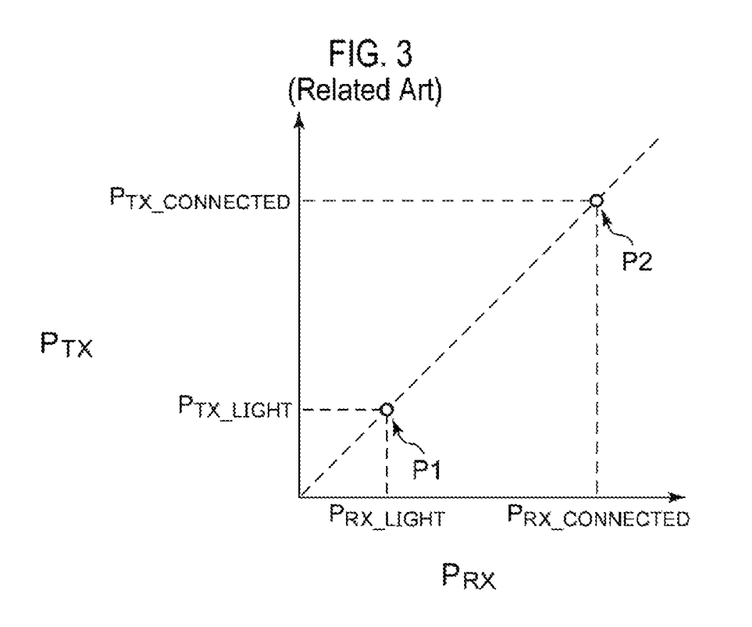
FIG. 3 is a view illustrating the calibration of power in a middle power standard.

FIG. 3 is a view illustrating the power calibration in the middle power standard. The horizontal axis represents a reception power $P_{RX}$ and the vertical axis represents a transmission power $P_{TX}$. The calibration is performed on the assumption of a situation where a foreign object is not present. A pair of transmission power $P_{TX}$ and reception power $P_{RX}$ are measured at two points P1 and P2. The first point P1 is measured in a light-load state where power supplied from the smoothing capacitor 36 of FIG. 2 to a load (not shown) is sufficiently small. In the light-load state, the power receiver 30 generates a CE packet such that a rectified voltage $V_{RECT}$ is identical to a target value. In response to the CE packet, the power transmitter 20 transmits a required transmission power $P_{TX}$. The power receiver 30 measures an output power $P_{OUT}$ and, further, a reception power $P_{RX\_LIGHT}$, based on the product of the rectified voltage $V_{RECT}$ and a load current, and transmits a control signal S3 indicating the measured output power $P_{OUT}$ and reception power $P_{RX\_LIGHT}$ to the power transmitter 20. When the power transmitter 20 receives data indicating the reception power $P_{RX\_LIGHT}$, it returns an acknowledgement (ACK) to the power receiver 30. Further, the power transmitter 20 measures a transmission power $P_{TX\_LIGHT}$ in the light-load state.

The second point P2 is measured in a state (referred to as a connected state) where a load current from the smoothing capacitor 36 of FIG. 1 to the power circuit 44 is increased. Also, in the connected state, the power receiver 30 generates a CE packet such that the rectified voltage $V_{RECT}$ is identical to a target value. In response to the CE packet, the power transmitter 20 transmits a required transmission power $P_{TX}$. The power receiver 30 measures a reception power $P_{RX\_CONNECTED}$ based on the product of the rectified voltage $V_{RECT}$ and a load current, and transmits a control signal S3 indicating the measured reception power $P_{RX\_CONNECTED}$ to the power transmitter 20. When the power transmitter 20 receives data indicating a reception power $P_{RX\_CONNECTED}$, it returns an ACK to the power receiver 30. Further, the power transmitter 20 measures a transmission power $P_{RX\_CONNECTED}$ in the connected state.

As aforementioned, calibration may need to be performed in a state where a foreign object is not present, and when the calibration time is lengthened, there is a high possibility that the foreign object interferes with the calibration. Thus, while the Qi standard requires that the calibration should be completed within a short time such as about 10 seconds, the power measurement at the two points in the light-load state and the connected state may not be completed within such a short time.

SUMMARY

The present disclosure provides some embodiments of a wireless power transmitter enabling reliable calibration.

According to one embodiment of the present disclosure, there is provided a wireless power transmitter for transmitting a power signal to a wireless power receiver. The wireless power transmitter includes: a transmission antenna including a transmission coil; an inverter circuit configured to apply an AC driving signal to the transmission antenna; and a control circuit configured to control the inverter circuit. The control circuit includes: a demodulator configured to demodulate a control signal received by the transmission antenna from the wireless power receiver; a transmission power measurement part configured to measure a transmission power to generate transmission power data; and a logic circuit configured to (1) control the inverter circuit based on the power control data included in the control signal to change the transmission power, (2) control the inverter circuit based on the control signal to be transmitted to the wireless power receiver to modulate the power signal, and (3) perform foreign object detection by a power loss method based on the transmission power data and reception power data included in the control signal.

The logic circuit is configured to perform a calibration sequence including: a first step) of controlling the transmission power based on the power control data when the wireless power receiver is in a first load state; (a second step) of modulating the power signal and transmitting an acknowledgement (ACK) to the wireless power receiver when first reception power data received in the first load state satisfies a first condition, and modulating the power signal and transmitting a non-acknowledgement (NACK) to the wireless power receiver when the first reception power data does not satisfy the first condition; (a third step) of controlling the transmission power based on the power control data when the wireless power receiver is in a second load state which is a heavy load state compared with the first load state; (a fourth step) of modulating the power signal and transmitting an ACK to the wireless power receiver when second reception power data received in the second load state satisfies a second condition, and modulating the power signal and transmitting a NACK to the wireless power receiver when the second reception power data does not satisfy the second condition; and (a fifth step) of performing a predetermined data processing based on at least the first reception power data and the second reception power data.

Further, the logic circuit is configured to perform; (a sixth step) of forcibly transmitting an ACK even though the second reception power data does not satisfy the second condition when a first predetermined period of time has elapsed since the calibration sequence started, and continuously waiting for the second reception power data satisfying the second condition; and (a seventh step) of performing a predetermined data processing when the second reception power data satisfying the second condition is received.

According to this embodiment, when the first predetermined period of time has lapsed, a forcible ACK can be issued to satisfy the requirement of the standard. After the forcible ACK, the wireless power transmitter extends calibration, receives the second reception power data continuously transmitted from the wireless power receiver, and continuously monitors whether the second condition is satisfied or not. When the second condition is satisfied, the wireless power transmitter generates calibration data using the second reception power data. Thus, even in a situation where calibration is not successful within the first predetermined time, the calibration can be performed.

When the reception power data satisfying the second condition is not received within the second predetermined period of time in the sixth step, the logic circuit may be configured to terminate the calibration sequence and start supplying power to the wireless power receiver in a state where the transmission power is limited to a predetermined value or less. This state refers to a calibration failure and there is a possibility that the precision of detecting a foreign object is lowered when a large power is supplied. Thus, it is possible to increase the safety by limiting the transmission power.

In some embodiments, the wireless power transmitter may conform to a Qi standard.

According to another embodiment of the present disclosure, there is provided a charger. The charger may include the wireless power transmitter described above.

Further, arbitrarily combining the foregoing components or substituting the components or expressions of the present disclosure with one another among a method, an apparatus, and a system is also effective as an embodiment of the present disclosure.

DETAILED DESCRIPTION

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the member A and C or the member B and the member C or does not impair function and effects achieved by combinations of the members A and C or the members B and C, in addition to a case where the member A and the member C or the member B and the member C are directly connected.

In a wireless power supply system based on the Qi standard according to an embodiment of the present disclosure, foreign object detection is performed by a power loss method, and before charging starts, calibration is performed. In this embodiment, a power transmitter 200 having the calibration function will be described.

Figure 4:
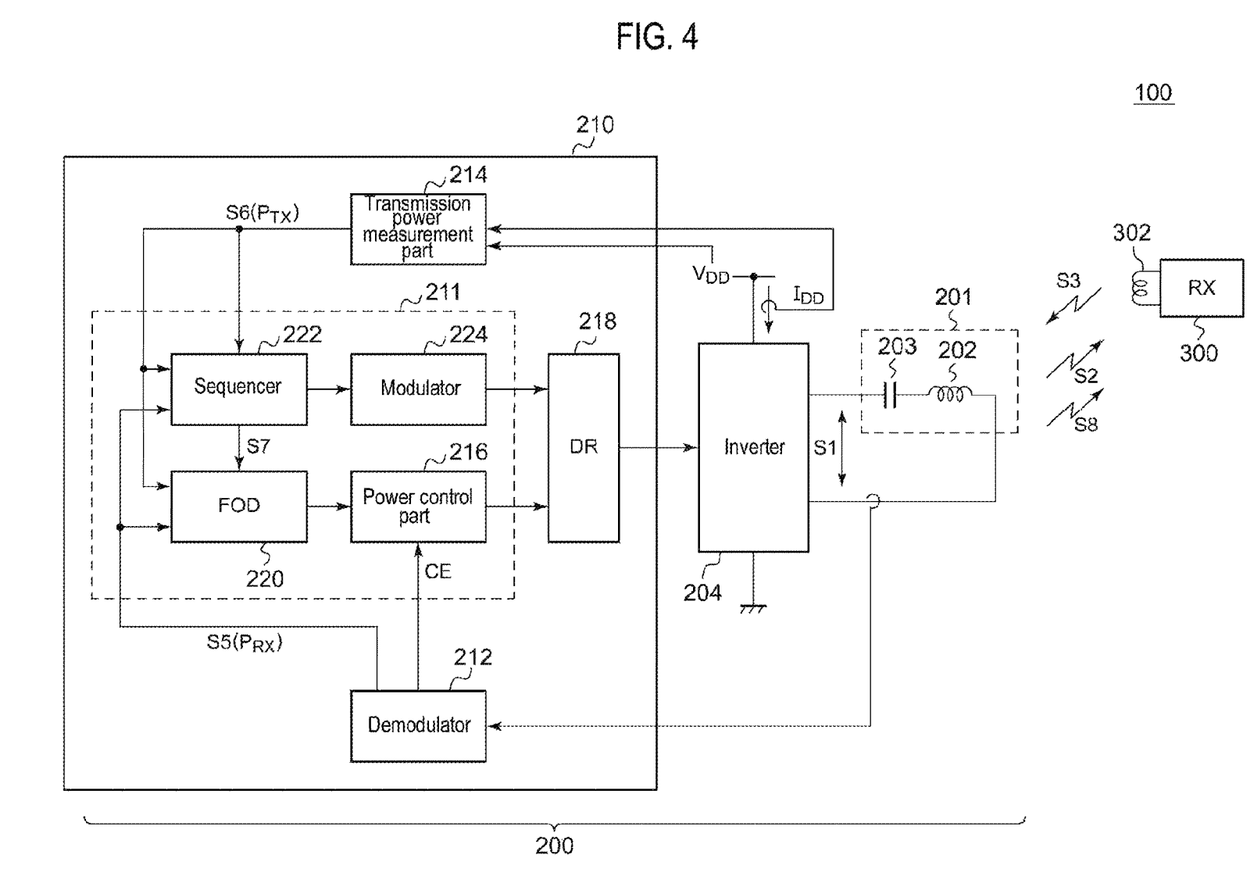
FIG. 4 is a block diagram of a power supply system including a wireless power transmitter according to an embodiment of the present disclosure.

FIG. 4 is a block diagram of a power supply system 100 including a wireless power transmitter according to an embodiment of the present disclosure. The power supply system 100 includes a power transmitter (TX) 200 and a power receiver (RX) 300. The power receiver 300 is mounted on an electronic device such as a mobile phone terminal, a smartphone, an audio player, a game machine, or a tablet terminal. In the following description, it is assumed that the power transmitter 200 and the power receiver 300 are based on the Qi standard.

The power transmitter 200 is mounted on, for example, a charger including a charge stand. The power transmitter 200 includes a transmission antenna 201, an inverter circuit 204, and a control circuit 210. The transmission antenna 201 includes a transmission coil (primary coil) 202 and a resonant condenser 203 connected in series.

The inverter circuit 204 is an H bridge circuit (full bridge circuit) or a half bridge circuit, converts a DC voltage $V_{DD}$ from a power source (not shown) into an AC driving signal S1, and supplies the same to the transmission antenna 201. As a result, a power signal S2 of an electromagnetic field is generated in the transmission coil 202 by a driving current flowing through the transmission coil 202.

The control circuit 210 comprehensively controls the entire power transmitter 200. The control circuit 210 includes a demodulator 212, a transmission power measurement part 214, a power control part 216, a driver 218, a foreign object detector 220, and a sequencer 222. The control circuit 210 may be a functional integrated circuit (IC) integrated on a single semiconductor substrate.

In the Qi standard, a communication protocol between the power transmitter 200 and the power receiver 300 is defined, and information may be transferred by a control signal S3 from the power receiver 300 to the power transmitter 200. The control signal S3 is amplitude-modulated (AM) using backscatter modulation and transmitted from the reception coil 302 (secondary coil) to the transmission coil 202. The control signal S3 includes, for example, power control data (also referred to as a control error (CE) packet) for controlling an amount of power supplied to the power receiver 300. The CE packet indicates an error between a rectified voltage generated by the power receiver 300 and a target value thereof, and when the rectified voltage is higher than the target value, the CE packet has a negative value, and when the rectified voltage is lower than the target value, the CE packet has a positive value. In the Qi standard, a feedback loop of proportional integral differential (PID) control is formed with respect to the transmission power by the power transmitter 200 and the power receiver 300.

In addition, the control signal S3 includes data indicating unique information of the power receiver 300, for example, a maximum value (maximum reception power) $P_{MAX\_RX}$ of reception power of the power receiver 300, and the like. Further, for the purpose of detecting a foreign object by the power loss method, reception power data S5 indicating a reception power $P_{RX}$ measured by the power receiver 300 is included.

The demodulator 212 demodulates the control signal S3 received by the transmission antenna 201 from the wireless power receiver 300. The power control part 216 controls the inverter circuit 204 based on the power control data (also referred to as a control error (CE) packet) included in the control signal S3 to change a transmission power $P_{TX}$.

The transmission power measurement part 214 measures a transmission power $P_{TX}$ and generates transmission power data S6 indicating the measured transmission power $P_{TX}$, for the purpose of foreign object detection by the power loss method and calibration thereof. The transmission power $P_{TX}$ may also be measured as the product of a source voltage $V_{DD}$ supplied to the inverter circuit 204 and a current $I_{DD}$ flowing in the inverter circuit 204.

The foreign object detector 220 performs the foreign object detection based on the power loss method in a power transfer phase. Specifically, the foreign object detector 220 compares the transmission power $P_{TX}$ and the reception power $P_{RX}$ based on the reception power data S5 and the transmission power data S6, and determines that a foreign object is present when a difference between the transmission power $P_{RX}$ and the reception power $P_{RX}$ exceeds an allowable value. When the foreign object is detected, the control circuit 210 stops the power transmission or lowers the transmission power. In addition, a relationship between the transmission power and the reception power is calibrated based on calibration data S7 generated by the sequencer 222.

The sequencer 222 performs a calibration process before detecting a foreign object by the power loss method. The calibration process refers to a series of processes to generate the calibration data S7, or a series of processes to obtain data required for generating the calibration data S7.

The modulator 224 modulates a switching frequency (FSK) of the inverter circuit 204 in order to transmit information S8 from the power transmitter 200 to the power receiver 300. The information S8 includes an acknowledgement ACK or a non-acknowledgement (NACK) to be described later.

The power control part 216, the foreign object detector 220, the sequencer 222, and the modulator 224 may be configured with a logic circuit as hardware, and thus, these elements are generally called a logic circuit 211.

Next, the calibration process by the power transmitter 200 will be described in detail. The calibration process is mainly performed by operating the other blocks of the control circuit 210 under the control of the sequencer 222.

Figure 5:
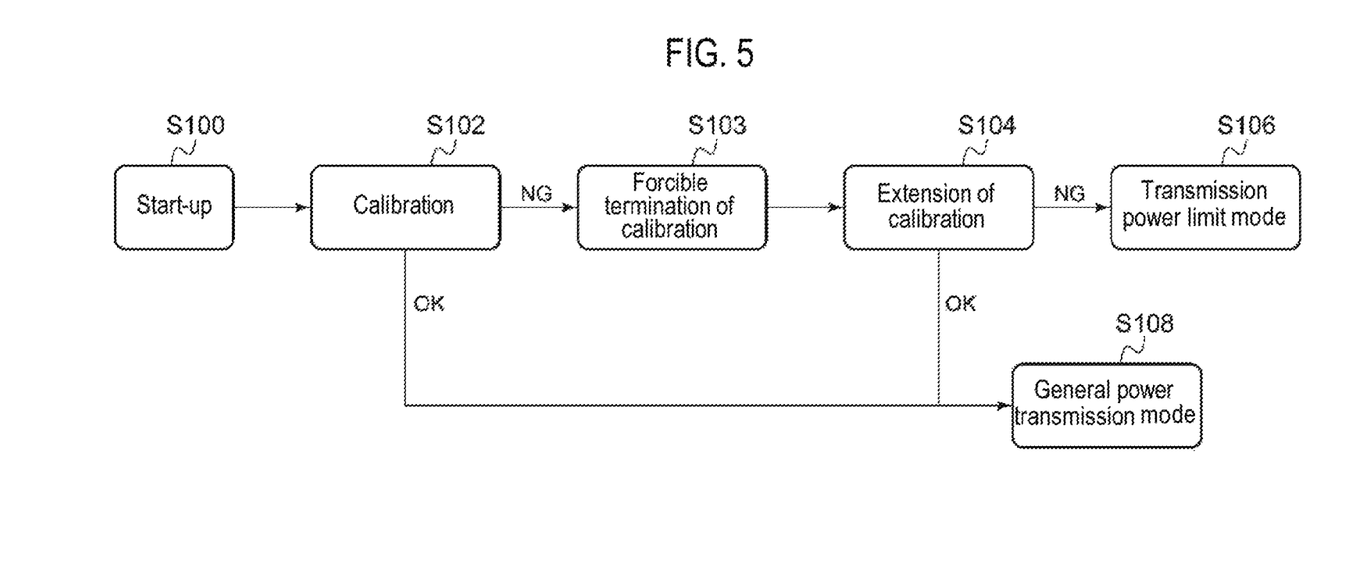
FIG. 5 is a flowchart of calibration according to an embodiment of the present disclosure.

FIG. 5 is a flowchart of calibration according to an embodiment of the present disclosure. In a start-up process S100, an analog ping phase and a digital ping phase defined in the Qi standard are executed. Further, a link is established between the power transmitter 20 and the power receiver 300 so that they can communicate with each other.

Thereafter, a calibration process S102 is performed. In the calibration process S102, a transmission power $P_{TX}$ and a reception power $P_{RX}$ are measured in two different load states P1 and P2, as described with reference to FIG. 3, and calibration is performed depending on the measurement values. When the calibration is successful (OK), the process proceeds to a general power transfer mode (S108).

If the calibration is not completed (NG) even when a first predetermined period of time $\tau_1$ (e.g., 10 seconds) has lapsed since the calibration process S102 started, the calibration is forcibly terminated (S103).

Once the calibration S103 is forcibly terminated, the process proceeds to an extension process of calibration (S104). When the calibration is successful by the extension process (S104), the process proceeds to the general power transfer mode S108.

After proceeding to the extension process S104, if the calibration is not completed even when a second predetermined period of time $\tau_2$ (e.g., 10 seconds) has further lapsed, it is determined that the calibration fails (NG). Then, the process proceeds to a transmission power limit mode S106. In the transmission power limit mode S106, the transmission power $P_{TX}$ is limited to a predetermined value or less. Specifically, in the transmission power limit mode S106, a power limited to a value (5 W) or less defined as a low power is supplied to the power receiver 30 corresponding to a middle power (15 W).

Figure 6:
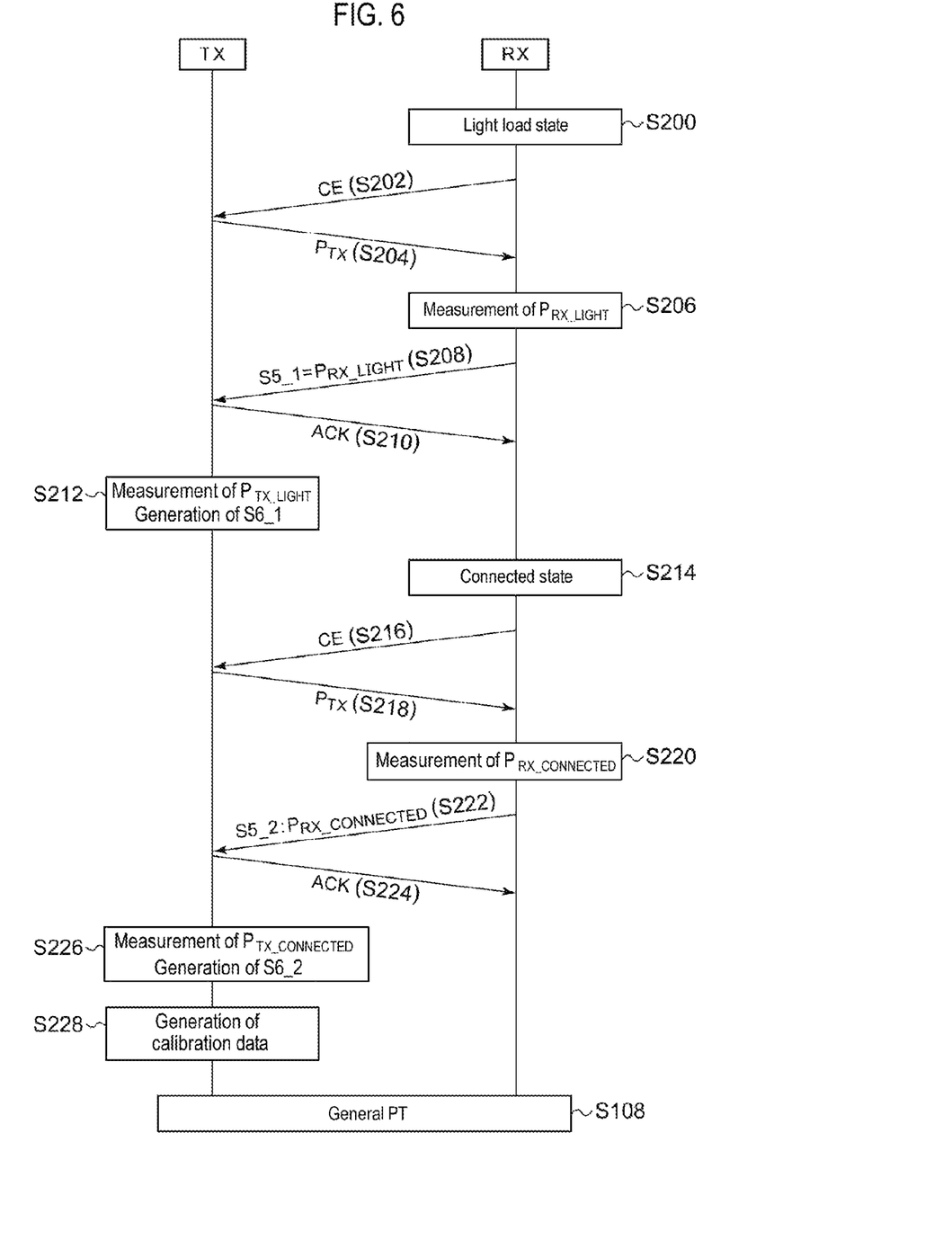
FIG. 6 is a view illustrating a first sequence of a calibration process.

FIG. 6 is a view illustrating a first sequence of the calibration process. This sequence corresponds to a state transitioned in the order of S100, S102, and S108 in FIG. 5. First, the power receiver RX is in a first load state (S200). The first load state is a light-load state where an input current of the power circuit 44 is sufficiently small. In this state, a CE packet is generated such that the rectified voltage $V_{RECT}$ is identical to a target value, and transmitted to the TX (S202). The power control part 216 of the TX adjusts the transmission power $P_{TX}$ based on the CE packet (S204).

When the state is stabilized in the RX, a reception power $P_{RX\_LIGHT}$ at that time is measured (S206), and first reception power data S5_1 indicating the measured reception power $P_{RX\_LIGHT}$ at that time is transmitted to the TX (S208). The sequencer 222 of the TX determines whether the first reception power data S5_1 satisfies a first condition or not, and when the first reception power data S5_1 satisfies the first condition, the TX returns an acknowledgement ACK, which indicates that the first reception power data S5_1 has been normally received, to the RX (S210). The acknowledgement ACK is transmitted by the modulator 224. In the first condition, the first reception power data S5_1 may be included in a range defined by the standard. Subsequently, the transmission power measurement part 214 of the TX measures a transmission power $P_{TX\_LIGHT}$ in the first load state, and generates first transmission power data S6_1 (S212).

Thereafter, the power receiver RX transitions to a second load state (S214). The second load state is a connected state where an input current of the power circuit 44 is larger than the input current of the power circuit 44 in the first load state. In this state, a CE packet is generated such that the rectified voltage $V_{RECT}$ is identical to a target value, and the transmission power $P_{TX}$ is adjusted depending on the CE packet (S216 and S218). When the state is stabilized in the RX, a reception power $P_{RX\_CONNECTED}$ at that time is measured (S220), and second reception power data S5_2 indicating the reception power $P_{RX\_CONNECTED}$ is transmitted to the TX (S222).

When the second reception power data S5_2 satisfies a predetermined second condition, the sequencer 222 of the TX returns an ACK (S224). In the second condition, the second reception power data S5_2 may be greater than a predetermined value (e.g., 5 W). Subsequently, the transmission power measurement part 214 of the TX measures a transmission power $P_{TX\_CONNECTED}$ in the second load state, and generates second transmission power data S6_2 (S226).

Thereafter, the sequencer 222 of the TX performs predetermined data processing based on the transmission powers and the reception powers measured in the two load states (S228). The predetermined data processing may be generation of calibration data S7 required for calibration of the power loss method. Then, the process proceeds to the general power transmission mode (S108). In the general power transmission mode S108, the foreign object detection is performed by the foreign object detector 220 based on the calibrated power loss method.

Figure 7:
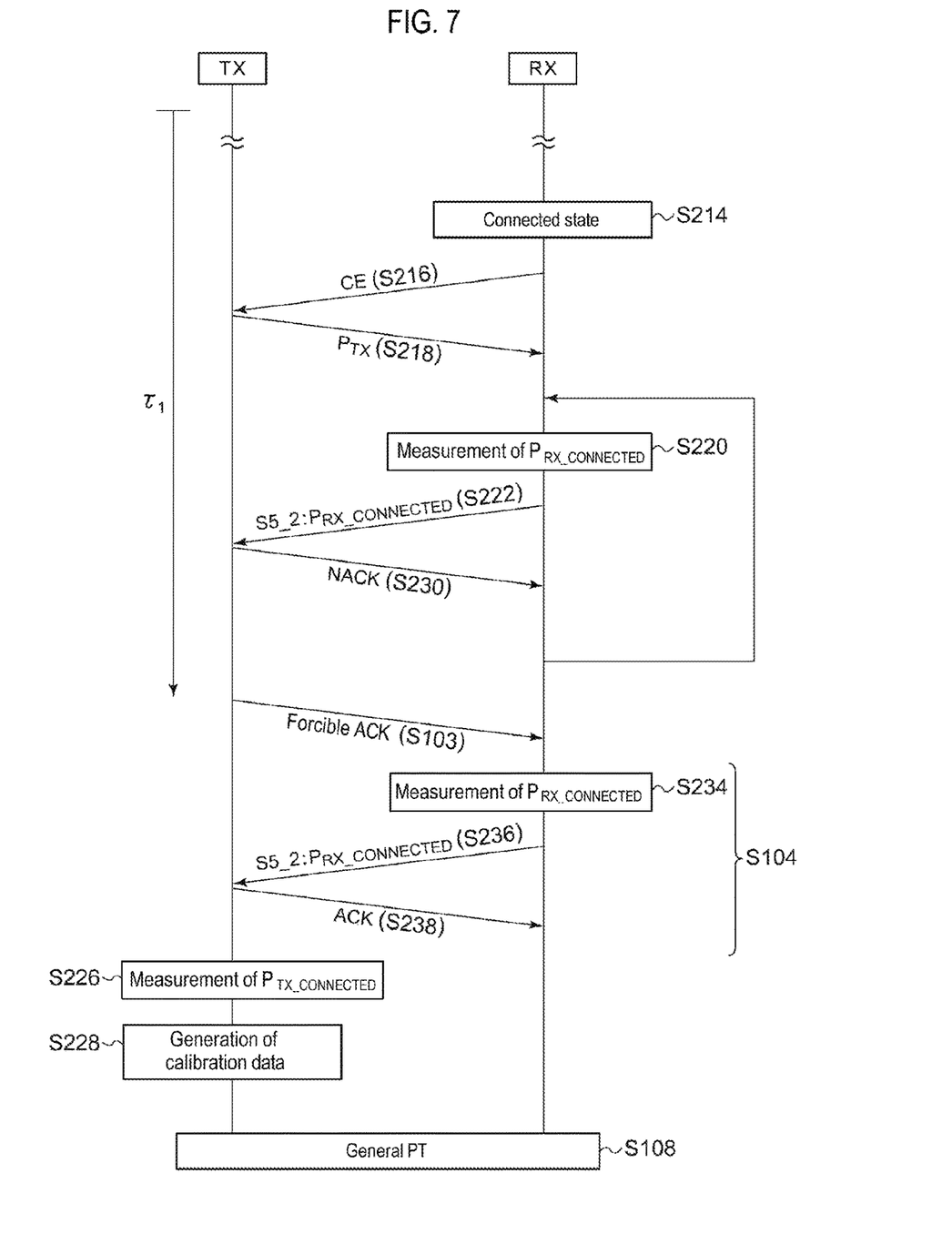
FIG. 7 is a view illustrating a second sequence of the calibration process.

FIG. 7 is a view illustrating a second sequence of the calibration process. This sequence corresponds to a state transitioned in the order of S100, S102, S103, S104, and S108 in FIG. 5. In FIG. 7, only a process after step S214 is illustrated, and a process prior to the step S214 is as illustrated in FIG. 6.

In the connected state, the reception power $P_{RX\_CONNECTED}$ is measured (S220), and the second reception power data S5_2 is transmitted to the TX (S222). When the second reception power data S5_2 does not satisfy the second condition, the TX returns a non-acknowledgement NACK (S230). The NACK is transmitted according to FSK by the modulator 224, like the ACK. Upon receipt of the NACK, the RX again measures a reception power $P_{RX\_CONNECTED}$ in the connected state (S220), and transmits the second reception power data to the TX (S222). This process is repeatedly performed until the RX receives an ACK.

When the ACK is returned within a first predetermined period of time $\tau_1$, the transmission power $P_{TX\_CONNECTED}$ is measured (S226), the calibration data S7 is generated (S228), and the general power transfer is performed (S108), as illustrated in the control flow of FIG. 6.

When the second reception power data S5_2 satisfying the second condition is not transmitted to the TX during the first predetermined period of time $\tau_1$ while the process of S220 to S230 is repeated, the sequencer 222 issues a forcible ACK and transmits the ACK from the TX to the RX, and the calibration is forcibly terminated once (S103).

Accordingly, the calibration is extended (S103 of FIG. 5). The RX continuously measures a reception power $P_{RX\_CONNECTED}$ (S234), and transmits second reception power data to the TX (S236). As a result, when the second condition is satisfied, an ACK is returned (S238). This process is repeatedly performed until the second condition is satisfied.

After transmitting the ACK, the TX measures a transmission power $P_{TX\_CONNECTED}$ (S226), and performs the calibration process (S228). Thereafter, the general power transfer is performed (S108).

Figure 8:
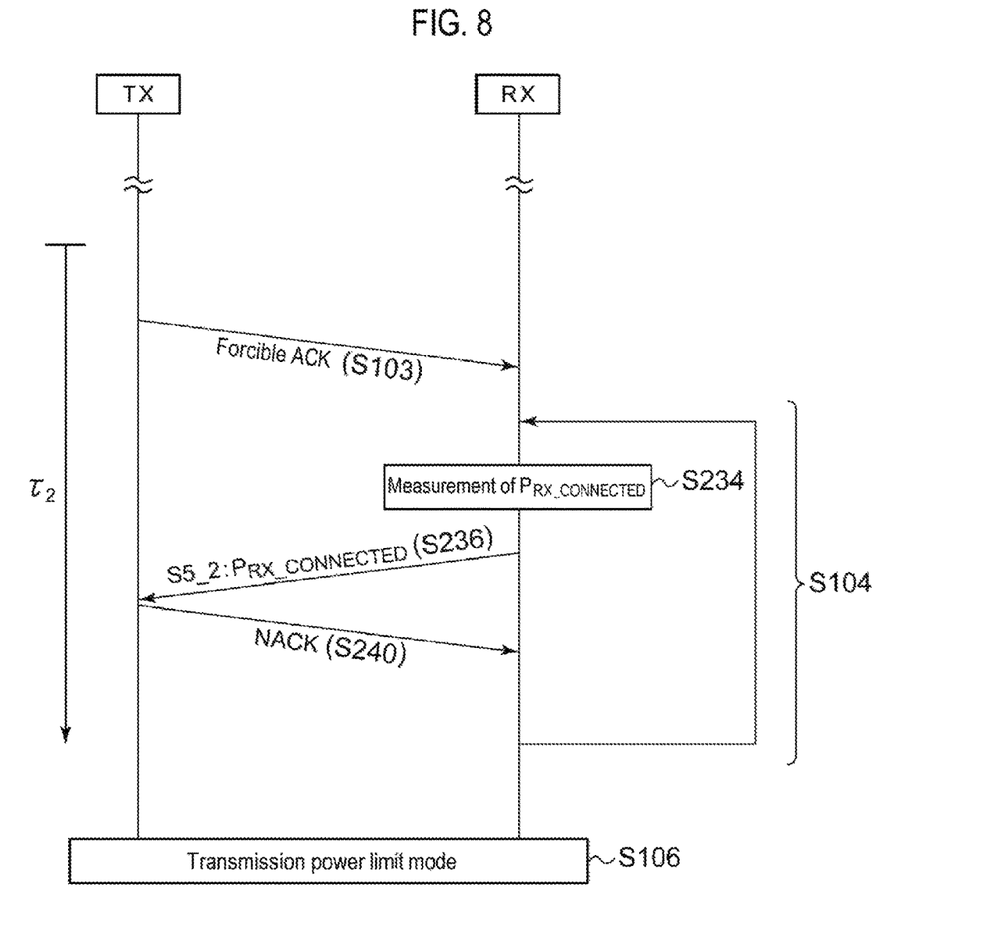
FIG. 8 is a view illustrating a third sequence of the calibration process.

FIG. 8 is a view illustrating a third sequence of the calibration process. This sequence corresponds to a state transitioned in the order of S100, S102, S103, S104, and S106 in FIG. 5. In FIG. 8, only a process after the forcible termination of calibration (S103) is illustrated, and a process prior to S103 is as illustrated in FIG. 7.

After the forcible termination of calibration (S103), the calibration is extended. During the extended period, the RX measures a reception power $P_{RX\_CONNECTED}$ in the connected state. The TX determines whether the second reception power data S5_2 satisfies the second condition or not. As long as the second condition is not satisfied, a NACK is returned (S240). When the second predetermined period of time $\tau_2$ has lapsed in a state where the ACK (S238) of FIG. 7 is not returned, the process proceeds to the transmission power limit mode S106, and a limited power (e.g., 5 W of a low power) is supplied to the RX of a mid power.

According to the power supply system 100, when the first predetermined period of time $\tau_1$ has lapsed, the forcible ACK may be issued to satisfy the requirement of the standard. Further, after issuing the forcible ACK, the wireless power transmitter 200 extends the calibration, receives the second reception power data S5_2 continuously transmitted from the wireless power receiver 300, and continuously monitors whether the received second reception power data S5_2 satisfies the second condition or not. When the received second reception power data S5_2 satisfies the second condition, the wireless power transmitter 200 generates calibration data S7 using the second reception power data S5_2. Accordingly, even in a situation where the calibration is not successful within the first predetermined period of time $\tau_1$, the calibration can be reliably performed.

Further, if the calibration fails even after the calibration is extended, power is supplied in a state where the transmission power is limited. In other words, in a situation where the precision of foreign object detection is low, it is possible to secure the safety by limiting the transmission power.

Figure 9:
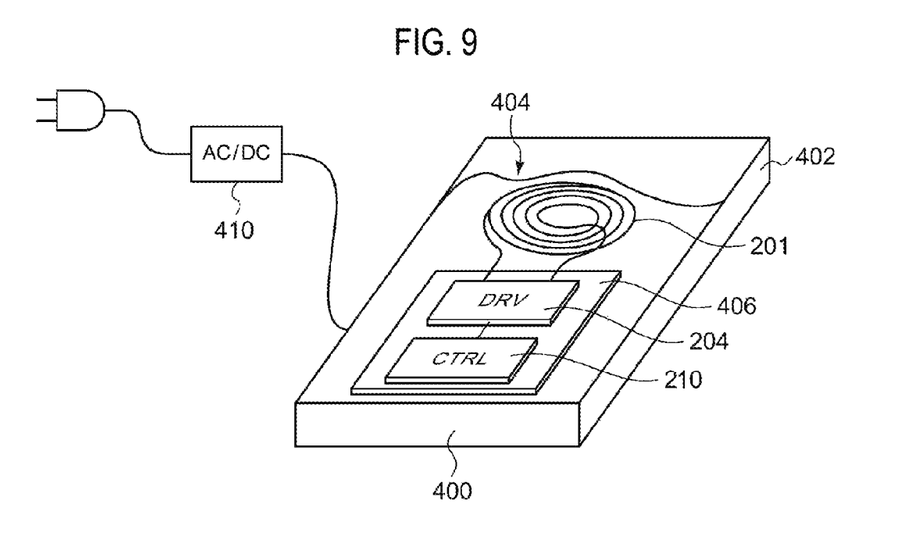
FIG. 9 is a circuit diagram of a charger including a power transmitter.

Next, the applications of the power transmitter 200 will be described. FIG. 9 is a circuit diagram of a charger 400 including the power transmitter 200. The charger 400 charges an electronic device 500 including the power receiver 300. The charger 400 includes a housing 402, a charge stand 404, and a circuit board 406. The electronic device to be supplied with power is disposed on the charge stand 404. The inverter circuit 204, the control circuit 210, and other circuit components are mounted on the circuit board 406. The transmission antenna 201 is laid out directly below the charge stand 404. The charger 400 may receive a DC voltage by an AC/DC converter 410 or may include an AC/DC converter therein. Alternatively, the charger 400 may be provided with a DC power from outside via a bus including a power feed line such as a universal serial bus (USB).

It is to be understood by those skilled in the art that the embodiments are merely illustrative and may be variously modified by any combination of the components or processes, and the modifications are also within the scope of the present disclosure. Hereinafter, these modifications will be described.

In the embodiments, the Qi standard has been described, but the present disclosure is also applicable to standards derived from the Qi standard to be developed in the future, or any other standard.

According to some embodiments of the present disclosure, it is possible to reliably perform the calibration of a power loss method.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A wireless power transmitter for transmitting a power signal to a wireless power receiver, comprising:
   a transmission antenna including a transmission coil;
   an inverter circuit configured to apply an AC driving signal to the transmission antenna; and
   a control circuit configured to control the inverter circuit, wherein the control circuit comprises:
   a demodulator configured to demodulate a control signal received by the transmission antenna from the wireless power receiver;
   a transmission power measurement part configured to measure a transmission power to generate a transmission power data; and a logic circuit configured to (1) control the inverter circuit based on the power control data included in the control signal to change the transmission power, (2) control the inverter circuit based on the control signal to be transmitted to the wireless power receiver to modulate the power signal, and (3) perform foreign object detection by a power loss method based on the transmission power data and a reception power data included in the control signal, wherein the logic circuit is configured to perform a calibration sequence including:

a first step of controlling the transmission power based on the power control data when the wireless power receiver is in a first load state;

a second step of modulating the power signal and transmitting an acknowledgement (ACK) to the wireless receiver when first reception power data received in the first load state satisfies a first condition, and modulating the power signal and transmitting a non-acknowledgement (NACK) to the wireless receiver when the first reception power data does not satisfy the first condition;

a third step of controlling the transmission power based on the power control data when the wireless receiver is in a second load state which is heavier than the first load state;

a fourth step of modulating the power signal and transmitting an ACK to the wireless receiver when second reception power data received in the second load state satisfies a second condition, and modulating the power signal and transmitting a NACK to the wireless receiver when the second reception power data does not satisfy the second condition; and a fifth step of generating a data required for calibration based on at least the first reception power data the second reception power data, wherein the logic circuit is further configured to perform:

a sixth step of forcibly transmitting an ACK even though the second reception power data does not satisfy the second condition when a first predetermined period of time has elapsed since the calibration sequence started, and of continuously waiting for the second reception power data satisfying the second condition; and a seventh step of generating data required for calibration when the second reception power data satisfying the second condition is received.

2. The wireless power transmitter of claim 1, wherein, when the reception power data satisfying the second condition is not received within the second predetermined period of time in the sixth step, the logic circuit is configured to terminate the calibration sequence and start power supply to the wireless power receiver in a state where the transmission power is limited to a predetermined value or less.

3. The wireless power transmitter of claim 1, wherein the wireless power transmitter is based on a Qi standard.

4. A charger having the wireless power transmitter of claim 1.

5. A control circuit for use in a wireless power transmitter for transmitting a power signal to a wireless power receiver, wherein the wireless power transmitter, in addition to the control circuit, comprises:

a transmission antenna including a transmission coil; and
an inverter circuit configured to apply an AC driving signal to the transmission antenna, wherein the control circuit comprises:

a demodulator configured to demodulate a control signal received by the transmission antenna from the wireless power receiver;

a transmission power measurement part configured to measure a transmission power to generate a transmission power data;

a power control part configured to control the inverter circuit based on a power control data included in the control signal to change the transmission power;

a sequencer configured to perform foreign object detection by a power loss method based on the transmission power data and a reception power data included in the control signal; and a modulator configured to change a switching frequency of the inverter circuit depending on an ACK or NACK issued by the sequencer, wherein the sequencer is configured to perform a calibration sequence including:

controlling the transmission power by the power control part based on the power control data when the wireless power receiver is in a first load state;

issuing an ACK when a first reception power data received in the first load state satisfies a first condition, and issuing a NACK when the first reception power data does not satisfy the first condition;

controlling the transmission power by the power control part based on the power control data when the wireless power receiver is in a second load state which is heavier than the first load state;

issuing an ACK when second reception power data received in the second load state satisfies a second condition, and issuing a NACK when the second reception power data does not satisfy the second condition; and performing data processing based on at least the first reception power data and the second reception power data, wherein the sequencer is configured to perform:

issuing a forcible ACK even though the second reception power data does not satisfy the second condition when a first predetermined period of time has elapsed since the calibration sequence started;

continuously waiting for the second reception power data satisfying the second condition; and performing the data processing when the second reception power data satisfying the second condition is received.

6. The control circuit of claim 5, wherein, when the reception power data satisfying the second condition is not received within the second predetermined period of time, the sequencer is configured to terminate the calibration sequence and start power supply to the wireless power receiver in a state where the transmission power is limited to a predetermined value or less.

7. The control circuit of claim 5, wherein the control circuit is based on a Qi standard.

8. A calibration method of detecting a foreign object by a power loss method in a wireless power supply system based on a Qi standard comprising a wireless power transmitter and a wireless power receiver, the method comprising:

setting the wireless power receiver to a first load state;

adjusting a transmission power by the wireless power transmitter based on a control error (CE) packet from the wireless power receiver;

measuring a reception power by the wireless power receiver in the first load state and transmitting a first reception power data indicating a measurement value to the wireless power transmitter;

when the first reception power data satisfying a first condition is received by the wireless power transmitter, transmitting an ACK to the wireless power receiver;

in response to the ACK, setting the wireless power receiver to a second load state which is heavier than the first load state;

adjusting a transmission power by the wireless power transmitter based on a CE packet from the wireless power receiver;

measuring a reception power by the wireless power receiver in the second load state and transmitting a second reception power data indicating a measurement value to the wireless power transmitter;

when the second reception power data satisfying a second condition is received by the wireless power transmitter, transmitting an ACK to the wireless power receiver;

performing a calibration process of a power loss method by the wireless power transmitter based on the first reception power data and the second reception power data;

forcibly transmitting an ACK by the wireless power transmitter even though the second reception power data does not satisfy the second condition when a first predetermined period of time has lapsed since the calibration sequence started; and maintaining the wireless power receiver receiving the forcible ACK in the second load state and continuously measuring and transmitting the second reception power data.

9. The method of claim 8, further comprising:

terminating the calibration sequence when a second predetermined period of time has lapsed after transmitting the forcible ACK, and starting power supply to the wireless power receiver in a state where the transmission power is limited to a predetermined value or less.

10. A calibration method of detecting a foreign object by a power loss method in a wireless power supply system based on a Qi standard comprising a wireless power transmitter and a wireless power receiver, comprising:

switching a load state of the wireless power receiver into two stages, and measuring a pair of reception power and transmission power in each stage;

performing a calibration process based on the pairs of transmission powers and reception powers measured in the two stages; and when the calibration process fails, limiting a transmission power from the wireless power transmitter to the wireless power receiver to a predetermined value or less.

* * * * *